(12) United States Patent
Sakakibara (10) Patent No.: US 9,712,076 B2
(45) Date of Patent: Jul. 18, 2017

(54) POWER CONVERTER WITH CLAMP CAPACITOR ON DC POWER SUPPLY LINE

(75) Inventor: Kenichi Sakakibara, Shiga (JP)

(73) Assignee: Daikin Industries, Inc., Osaka (JP)

( * ) Notice: Subject to any disclaimer, the term of this patent is extended or adjusted under 35 U.S.C. 154(b) by 652 days.

(21) Appl. No.: 13/001,096

(22) PCT Filed: Jun. 1, 2009

(86) PCT No.: PCT/JP2009/059999
§ 371 (c)(1),
(2), (4) Date: Dec. 23, 2010

(87) PCT Pub. No.: WO2009/157276
PCT Pub. Date: Dec. 30, 2009

(65) Prior Publication Data
US 2011/0134663 A1  Jun. 9, 2011

(30) Foreign Application Priority Data

Jun. 27, 2008  (JP) ................................. 2008-168490

(51) Int. Cl.
*H02M 5/458* (2006.01)
*H02M 7/217* (2006.01)
(Continued)

(52) U.S. Cl.
CPC ........... *H02M 7/2173* (2013.01); *H02M 1/32* (2013.01); *H02M 5/293* (2013.01); *H02M 5/458* (2013.01);
(Continued)

(58) Field of Classification Search
CPC ......... H02M 2001/0006; H02M 5/485; H02M 2001/0087; H02M 5/40; H02M 5/42;
(Continued)

(56) References Cited

U.S. PATENT DOCUMENTS 5,430,636 A * 7/1995 Kachi .............................. 363/58
5,705,904 A * 1/1998 Kuriyama ............... H02M 1/32
                                                318/400.21

(Continued)

FOREIGN PATENT DOCUMENTS

JP  2001-314081 A  11/2001
JP  2007-295686 A  11/2007

OTHER PUBLICATIONS

Klumpner et al., "Active Compensation of Unbalanced Supply Voltages for Two-Stage Direct Power Converters Using the Clamp Capacitor," IEEE, 2005, pp. 2376-2382.

(Continued)

*Primary Examiner* — Harry Behm
(74) *Attorney, Agent, or Firm* — Birch, Stewart, Kolasch & Birch, LLP (57) ABSTRACT

A plurality of capacitors are interposed between ones of a plurality of input lines. The clamp capacitor is connected between two DC power supply lines. A current-source converter includes a plurality of switch devices, where x represents r, s and t. The switch device selects conduction/non-conduction through a first diode between corresponding one of the input lines and the first DC power supply line and conduction/non-conduction through a second diode between said corresponding one of input lines and the second DC power supply line based on external signals and brings corresponding one of the input lines with the first and second DC power supply lines in a state of not receiving the signals.

10 Claims, 7 Drawing Sheets (51) Int. Cl.
 *H02M 5/293* (2006.01)
 *H02M 1/32* (2007.01)
 *H02M 7/219* (2006.01)
 *H02M 1/00* (2006.01)

(52) U.S. Cl.
 CPC .... *H02M 7/219* (2013.01); *H02M 2001/0006* (2013.01)

(58) Field of Classification Search
 CPC ...... H02M 5/44; H02M 5/4505; H02M 5/453; H02M 5/4585; H02M 5/458
 USPC .................. 363/35, 37, 51, 47, 48; 323/908
 See application file for complete search history.

(56) References Cited

U.S. PATENT DOCUMENTS

| | | | | |
|---|---|---|---|---|
| 5,764,496 | A * | 6/1998 | Sato et al. | 363/37 |
| 5,943,223 | A * | 8/1999 | Pond | 363/53 |
| 6,166,924 | A | 12/2000 | Assow | |
| 2005/0040792 | A1 * | 2/2005 | Nair | 320/162 |
| 2006/0072352 | A1 * | 4/2006 | Ghosh | H02M 1/4233 363/53 |
| 2006/0215430 | A1 | 9/2006 | Fu et al. | |
| 2007/0091089 | A1 | 4/2007 | Jiao et al. | |
| 2007/0177407 | A1 * | 8/2007 | Bruckmann | H02M 5/458 363/8 |
| 2008/0094864 | A1 * | 4/2008 | Sekimoto | H02M 5/458 363/36 |
| 2009/0086515 | A1 | 4/2009 | Sakakibara | |
| 2009/0128224 | A1 * | 5/2009 | Toyoshima | 327/514 |

OTHER PUBLICATIONS

Mino, et al. "A Gate Drive Circuit for Silicon Carbide JFET," Proceedings of IECON '03, p. 1162-1166, 2003.
Schafmeister, et al. "Evaluation of 1200V-Si-IGBTs and 1300V-SiC-JFETS for Application in Three-Phase Very Sparse Matrix AC-AC Converter Systems," APEC '03, 2003.
Schonberger, et al. "An Ultra Sparse Matrix Converter with a Novel Active Clamp Circuit," Proceedings of PCC-Nagoya, p. 784-791, 2007.
Wei, et al. "Matrix Converter Topologies With Reduced Number of Switches," Proceedings of PESC 2002, vol. 1, p. 57-63 (2002).

* cited by examiner

POWER CONVERTER WITH CLAMP CAPACITOR ON DC POWER SUPPLY LINE

TECHNICAL FIELD

The present invention relates to a power converter, and more particularly, to a direct power converter including a clamp capacitor in a DC link.

BACKGROUND ART

Lixiang Wei, T. A. Lipo, Ho Chan, "Matrix Converter Topologies with Reduced Number of Switches", Proc. of PESC 2002, vol. 1, pp. 57-63 (2002) describes a direct power converter with a DC link. In the direct power converter, a converter and an inverter are connected through the DC link to each other.

The converter converts an AC current on an input side to a DC current and outputs it to the DC link. The converter main circuit described therein is incapable of performing conversion opposite thereto, that is, converting the DC current of the DC link to the AC current and outputting it to the input side. Therefore, the converter cannot regenerate the induced current of an inductive load that is generated when the inverter is interrupted to the power supply side.

Accordingly, in Lixiang Wei, T. A. Lipo, Ho Chan, "Matrix Converter Topologies with Reduced Number of Switches", Proc. of PESC 2002, vol. 1, pp. 57-63 (2002), the clamp capacitor is provided in the DC link and the above-mentioned induced current is absorbed by the clamp capacitor.

Further, a filter composed of a reactor and an input capacitor is provided on the input side of the converter. Therefore, if the converter is brought into conduction when the clamp capacitor is discharged, the input capacitor and the clamp capacitor are short-circuited to each other, leading to a possibility that an inrush current may flow from the input capacitor to the clamp capacitor.

The technology capable of solving the above-mentioned problem is described in, for example, J. Schonberger, T. Friedli, S. D. Round and J. W. Kolar, "An Ultra Sparse Matrix Converter with a Novel Active Clamp Circuit", Proc. of PCC-Nagoya 2007 (2007). J. Schonberger, T. Friedli, S. D. Round and J. W. Kolar, "An Ultra Sparse Matrix Converter with a Novel Active Clamp Circuit", Proc. of PCC-Nagoya 2007 (2007) describes that, in the direct power conversion circuit with a DC link that includes a clamp circuit, the diode rectifier circuit for charging the clamp capacitor is separately provided.

K. Mino, S. Herold and J. W. Kolar, "A Gate Drive Circuit for Silicon Carbide JFET", Proc. of IECON '03, pp. 1162-1166 (2003) and F. Schafmeister, S. Herold and J. W. Kolar, "Evaluation of 1200V-Si-IGBTs and 1300V-SiC-JFETs for Application in Three-Phase Very Sparse Matrix AC-AC Converter Systems", APEC '03 (2003) disclose the technologies related to the present invention.

DISCLOSURE OF INVENTION

Problems to be Solved by the Invention

A direct power converter that prevents an inrush current from an input capacitor to a clamp capacitor is described in the specification of Japanese Patent Application No. 2007-220907. In the direct power converter, two clamp capacitors connected in series with each other are provided in the DC link, and a neutral point of a power supply and a point between the clamp capacitors are connected to each other. In charging the clamp capacitor, the converter is appropriately controlled so that the AC voltage from the power supply is subjected to voltage doubler rectification to be supplied to the clamp capacitor.

Although the above-mentioned technology is capable of preventing an inrush current from flowing from the input capacitor to the clamp capacitor, a dedicated charging circuit (for example, a circuit that connects a neutral point of a power supply and a point between clamp capacitors through a resistor) is required, which leads to increases in circuit size and manufacturing cost.

An object of the present invention is therefore to provide a power converter capable of omitting a dedicated charging circuit while preventing an inrush current from a capacitor on an input side of a converter to a clamp capacitor.

Means to Solve the Problems

According to a first aspect of the present invention, a power converter includes: a plurality of input lines (ACLr, ACLs, ACLt) applied with a polyphase AC voltage; a plurality of capacitors (Cr, Cs, Ct) interposed between ones of the plurality of input lines; a first DC power supply line (L1); a second DC power supply line (L2) applied with a lower potential compared with the first DC power supply line; a converter (1) including: first diodes (Drp, Dsp, Dtp) respectively provided correspondingly to the plurality of input lines, each of said first diodes having an anode connected to corresponding one side of the plurality of input lines and a cathode connected to the first DC power supply line side; second diodes (Dm, Dsn, Dtn) respectively provided correspondingly to said plurality of input lines, each of said second diodes having an anode connected to the second DC power supply line side and a cathode connected to the corresponding one side of the plurality of input lines; and switch parts (Trp, Tsp, Ttp, Trn, Tsn, Ttn) respectively provided correspondingly to the plurality of input lines, selecting conduction/non-conduction through the first diode between the corresponding one of the plurality of input lines and the first DC power supply line and conduction/non-conduction through the second diode between the corresponding one of the plurality of input lines and the second DC power supply line based on external signals (SSrp, SSrn; SSsp, SSsn; SStp, SStn) and bringing the corresponding one of the plurality of input lines with the first and second DC power supply lines in a state of not receiving the signals; and a clamp capacitor (Cc1, Cc2) connected between the first and second DC power supply lines.

According to a second aspect of the power converter of the present invention, in the power converter according to the first aspect, the switch parts (Trp, Tsp, Ttp, Tm, Tsn, Ttn) include a junction field effect transistor.

According to a third aspect of the present invention, in the power converter according to the first or second aspect, the power converter further includes a third diode (D1) having an anode positioned on the first DC power supply line (L1) side and a cathode positioned on the second DC power supply line (L2) side, being connected in series with the clamp capacitor; a plurality of output lines (ACLu, ACLv, ACLw); and an inverter (3) including: a high-arm-side switch device (Sup, Svp, Swp) selecting conduction/non-conduction between one of the plurality of output lines and the first DC power supply line; and a low-arm-side switch device (Sun, Svn, Swn) selecting conduction/non-conduction between the one of the plurality of output lines and the second DC power supply line.

According to a fourth aspect of the power converter of the present invention, in the power converter according to the third aspect, the high-arm-side switch device (Sup, Svp, Swp) and the low-arm-side switch device (Sun, Svn, Swn) include an insulated gate bipolar transistor.

Effects of the Invention

According to the first aspect of the power converter of the present invention, in a state of not receiving a signal, the switch part connects one of the input lines with the first DC power supply line through the first diode and connects one of the input lines with the second DC power supply line through the second diode. Accordingly, the converter functions as a rectifier circuit in the state of not receiving a signal. Therefore, when a polyphase AC voltage is applied to the input line in the state in which the switch part does not receive the signal, for example, before the power converter is activated, the clamp capacitor is charged with a DC voltage. In this case, the voltage is applied to the capacitor and the clamp capacitor substantially at the same time, whereby an inrush current is not generated from the capacitor to the clamp capacitor.

Further, a dedicated charging circuit is not required, whereby a circuit size and a manufacturing cost can be reduced.

According to the second aspect of the power converter of the present invention, the junction field effect transistor is brought into conduction in a state of not receiving a signal, whereby a junction field effect transistor that is easily configured as a switch part can be used without change. In addition, it is possible to apply a junction field effect transistor that is easily manufactured when configuring it with a wide gap device of SiC, GaN or the like.

According to the third aspect of the power converter of the present invention, after the clamp capacitor is charged with a voltage, it is possible to made itself function as a direct AC power converter that does not include the power storing means such as a smoothing capacitor between the first and second DC power supply lines. Further, the current returned from the voltage-source inverter can be stored in the clamp capacitor, and the voltage can be kept constant.

The fourth aspect of the power converter according to the present invention is conducive to achieving the power converter according to the third aspect.

The object, features, aspects, and advantages of the present invention will be more apparent from the following detailed description in conjunction with the attached drawings.

BEST MODES FOR CARRYING OUT THE INVENTION

First Embodiment

Figure 1:
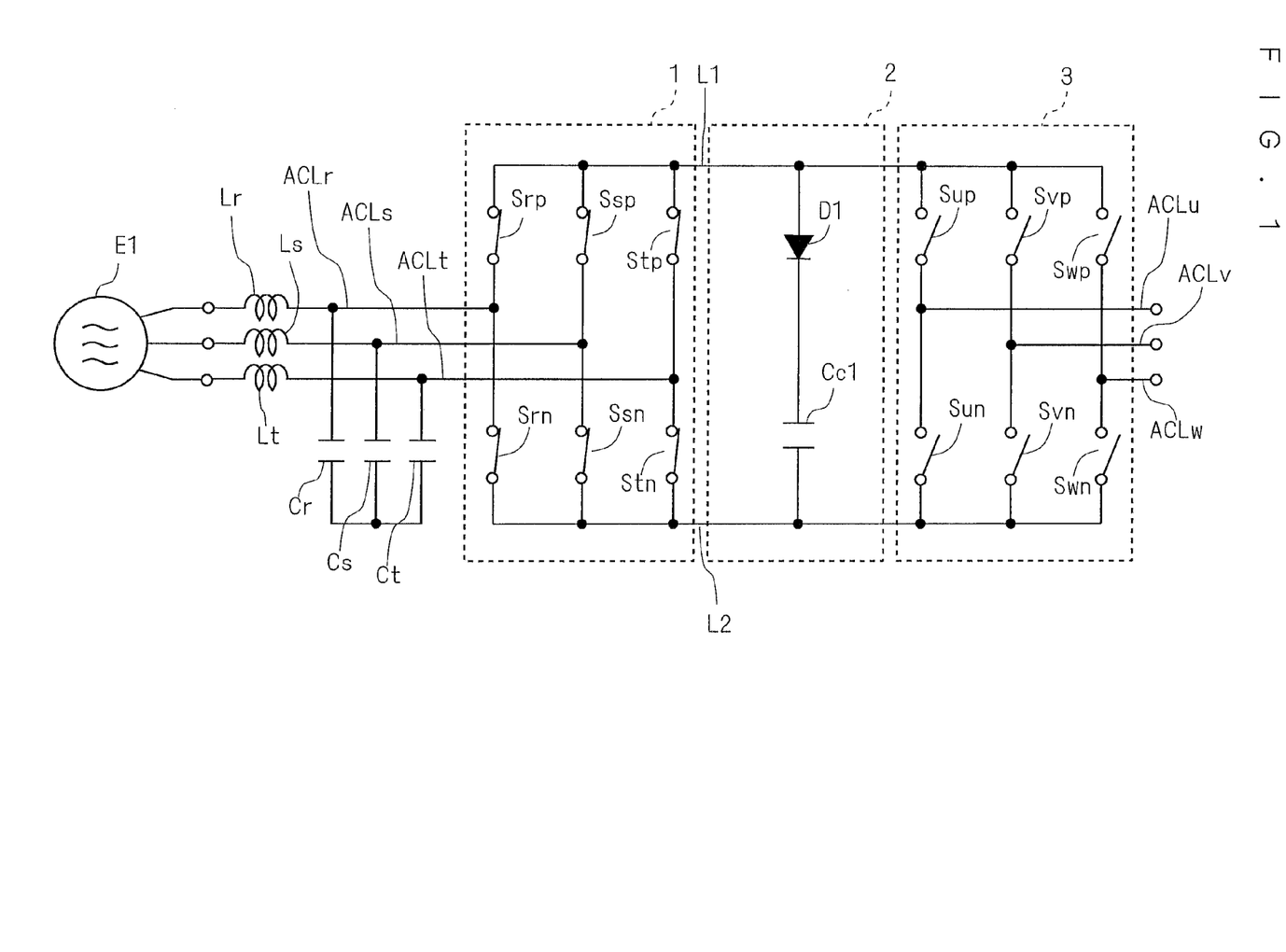
FIG. 1 is a diagram showing an example of a conceptual configuration of a direct AC power converter according to a first embodiment.

FIG. 1 shows an example of a conceptual configuration of a direct power converter according to a first embodiment. The direct power converter includes a plurality of input lines ACLr, ACLs and ACLt, reactors Lr, Ls and Lt, capacitors Cr, Cs and Ct, a current-source converter 1, DC power supply lines L1 and L2, a clamp circuit 2, a voltage-source inverter 3, and a plurality of output lines ACLu, ACLv and ACLw.

The input lines ACLr, ACLs and ACLt are each connected with a power supply E1. The power supply E1 is a polyphase AC power supply and, for example, a three-phase AC power supply. The power supply E1 applies a three-phase AC voltage between ones of the input lines ACLr, ACLs and ACLt.

The reactors Lr, Ls and Lt are provided on the input lines ACLr, ACLs and ACLt, respectively.

The capacitors Cr, Cs and Ct are interposed between ones of phases of the input lines ACLr, ACLs and ACLt through, for example, Y-connection. That is, the capacitors Cr and Cs are connected in series between the input lines ACLr and ACLs. The capacitors Cs and Ct are connected in series between the input lines ACLs and ACLt. The capacitors Ct and Cr are connected in series between the input lines ACLt and ACLr. These are provided on the input side of the current-source converter 1 and function as voltage sources. On the other hand, the capacitors Cr, Cs and Ct can also be considered to form, together with the reactors Lr, Ls and Lt, a carrier current component removing filter for removing a carrier current component, respectively.

The current-source converter 1 includes a plurality of switch devices Sxp and Sxn (where x represents r, s and t; the same holds true for the following). Through selecting operation of the plurality of switch devices Sxp and Sxn, the three-phase AC voltage applied between the input lines ACLr, ACLs and ACLt is selectively supplied between the DC power supply lines L1 and L2, whereby the current flows through the DC power supply lines L1 and L2. Accordingly, the DC voltage is applied between the DC power supply lines L1 and L2, with the DC power supply line L1 as a high potential side and the DC power supply line L2 as a low potential side.

Figure 2:
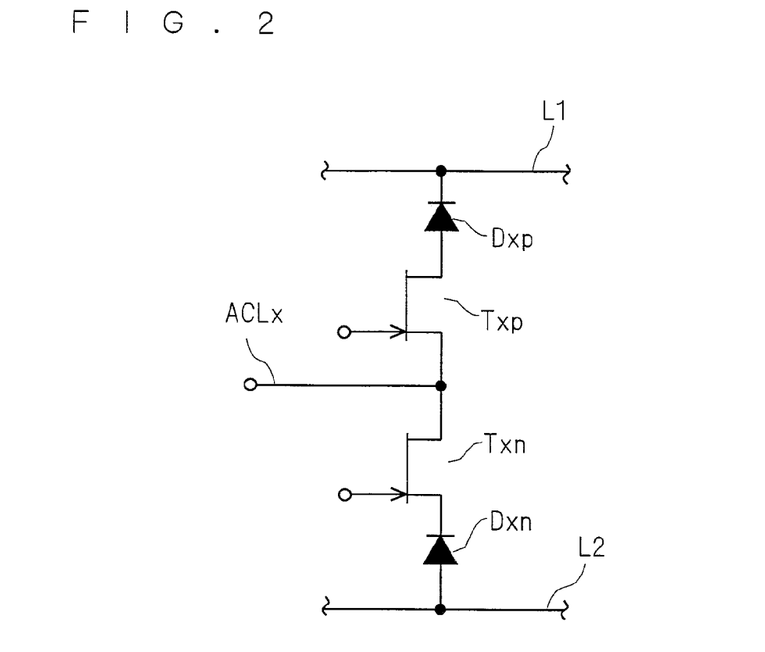
FIG. 2 is a diagram showing an example of a conceptual configuration of a current-source converter.

FIG. 2 shows a conceptual example of a specific configuration of the current-source converter 1. Note that FIG. 2 shows the configuration for one phase. The switch device Sxp includes a transistor Txp and a fast diode Dxp. The switch device Sxn includes a transistor Txn and a fast diode Dxn.

An anode of the fast diode Dxp and a cathode thereof are connected to the input line ACLx side and the DC power supply line L1 side, respectively. An anode of the fast diode Dxn and a cathode thereof are connected to the DC power supply line L2 side and the input line ACLx side, respectively.

Conduction/non-conduction of the transistors Txp and Txn is selected upon reception of an external signal. The transistors Txp and Txn are so-called normally-on-type switches that are brought into conduction in the state of not receiving the signal. The transistor Txp is provided between the input line ACLx and the anode of the fast diode Dxp. The transistor Txn is provided between the input line ACLx and the cathode of the fast diode Dxn.

In the current-source converter 1 as described above, the transistors Txp and Txn are considered as a switch part that selects, based on an external signal, conduction/non-conduction through the fast diode Dxp between the input line ACLx and the DC power supply line L1 and conduction/non-conduction through the fast diode Dxn between the input line ACLx and the DC power supply line L2 and brings the input line ACLx into conduction with the DC power supply lines L1 and L2 in the state of not receiving the signal.

The clamp circuit 2 includes a diode D1 and a clamp capacitor Cc1. The clamp capacitor Cc1 is connected between the DC power supply lines L1 and L2. The diode D1 has an anode positioned on the DC power supply line L1 side and a cathode positioned on the DC power supply line L2 side and is connected in series with the clamp capacitor Cc1.

The clamp circuit 2 causes the current flowing itself, which flows from an inductive load (for example, motor) connected to the output lines ACLu, ACLv and ACLw to the DC power supply line L1 through the voltage-source inverter 3, stores the inductive current of the inductive load, and keeps a voltage constant.

The voltage-source inverter 3 includes a plurality of high-arm-side switch devices Syp (where y represents u, v and w; the same holds true for the following) and low-arm-side switch devices Syn, which are simply referred to as switch devices Syp and Syn below. The switch device Syp selects conduction/non-conduction between the DC power supply line L1 and the output line ACLy. The switch device Syn selects conduction/non-conduction between the DC power supply line L2 and the output line ACLy. Through selecting operation of the plurality of switch devices Syp and Syn, the voltage between the DC power supply lines L1 and L2 is converted and output to the output lines ACLu, ACLv and ACLw.

Figure 3:
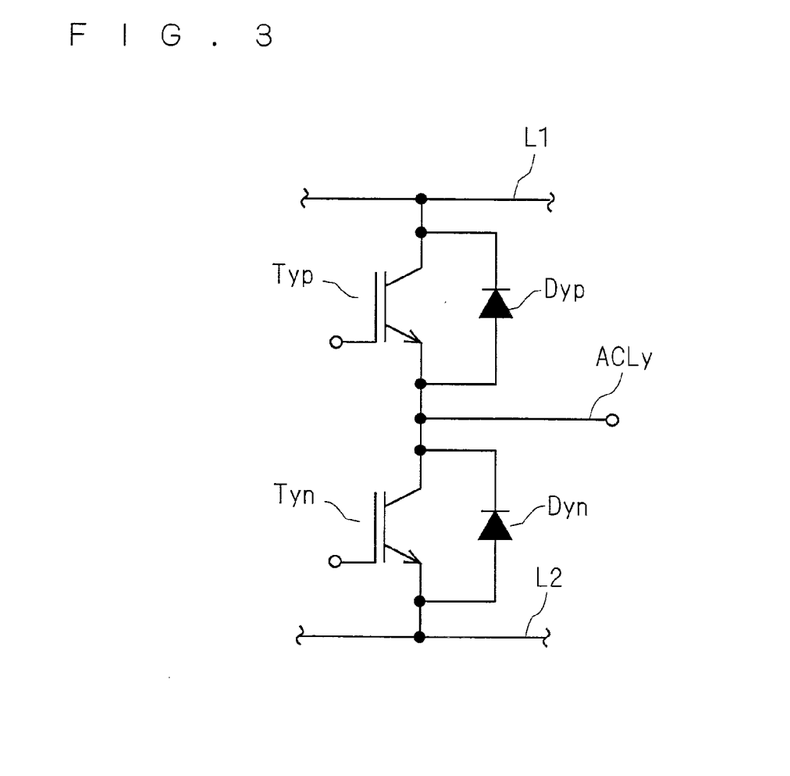
FIG. 3 is a diagram showing an example of a conceptual configuration of a voltage-source converter.

FIG. 3 shows a conceptual example of a specific configuration of the voltage-source inverter 3. Note that FIG. 3 shows the configuration for one phase. The switch device Syp includes a transistor Typ and a free wheeling diode Dyp. The switch device Syn includes a transistor Tyn and a free wheeling diode Dyn.

A collector of the transistor Typ and a cathode of the free wheeling diode Dyp are connected to the DC power supply line L1. An emitter of the transistor Tyn and an anode of the free wheeling diode Dyn are connected to the DC power supply line L2. An emitter of the transistor Typ, a collector of the transistor Tyn, an anode of the free wheeling diode Dyp and a cathode of the free wheeling diode Dyn are connected to the output line ACLy in common.

The transistors Typ and Tyn are normally-off-type switches and, for example, are insulated gate bipolar transistors (hereinafter, referred to as IGBTs).

In the direct power converter as described above, the diode D1 blocks discharging of the voltage charged into the clamp capacitor Cc1. Therefore, in supplying a current to the inductive load, the direct power converter is capable of functioning as a direct power converter that does not include the power storing means such as a smoothing capacitor or a reactor in the DC power supply lines L1 and L2. The clamp circuit 2 stores the current from the voltage-source inverter 3 that is generated in a case where, for example, the switch devices Syp and Syn are turned off, and keeps the voltage constant.

Next, description is given of the operation related to charging of the clamp capacitor Cc1 of the direct power converter.

The transistors Txp and Txn are normally-on-type switches, and thus the current-source converter 1 functions as a rectifier circuit in the state of not receiving an external signal. Accordingly, when a three-phase AC voltage is applied to the input lines ACLr, ACLs and ACLt in the state where the transistors Txp and Txn do not receive a signal, for example, before activation of the direct power converter, the clamp capacitor Cc1 is charged with a DC voltage.

On this occasion, the capacitors Cr, Cs and Ct and the clamp capacitor Cc1 are connected to each other through the current-source converter 1. When the three-phase AC voltage is applied to the input lines ACLr, ACLs and ACLt, the voltage is applied to the clamp capacitor Cc1 and the capacitors Cr, Cs and Ct substantially at the same time. Accordingly, charging of the clamp capacitor Cc1 can be started in the state in which none of the capacitors Cr, Cs and Ct is charged with a voltage. Therefore, it is possible to prevent an inrush current from flowing from the capacitors Cr, Cs and Ct to the clamp capacitor Cc1 at the start of charging the clamp capacitor Cc1.

Further, there is not required a dedicated charging circuit for charging the clamp capacitor Cc1 while avoiding the inrush current from the capacitors Cr, Cs and Ct to the clamp capacitor Cc1, whereby a circuit size and a manufacturing cost can be reduced.

Further, junction field effect transistors (hereinafter, referred to as J-FETs) are used as the transistors Txp and Txn in FIG. 2. The J-FET is a normally-on-type switch device and has a simpler configuration compared with, for example, an IGBT.

Figure 4:
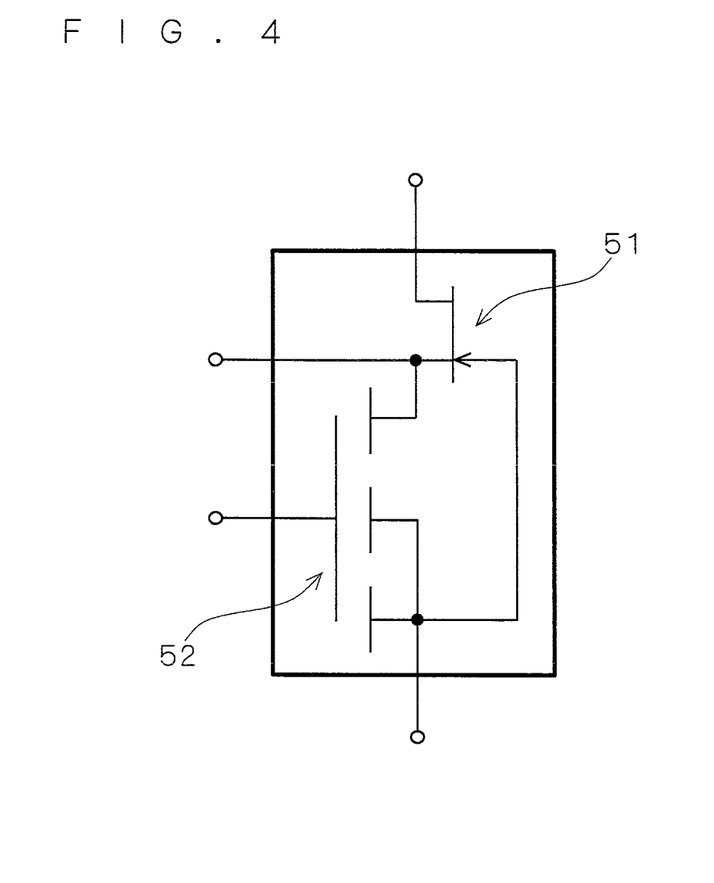
FIG. 4 is a diagram showing a hybrid device in which a J-FET and a MOS-FET are cascade-connected.

Conventionally, normally-off-type switch devices are used as the transistors Txp and Txn. For this reason, in order to use a normally-on-type J-FET, this and a metal-oxide-semiconductor field-effect transistor (MOS-FET) are conventionally cascode-connected. FIG. 4 shows the hybrid device. A J-FET 51 and a MOS-FET 52 are cascode-connected. The above-mentioned hybrid device is described in K. Mino, S. Herold and J. W. Kolar, "A Gate Drive Circuit for Silicon Carbide JFET", Proc. of IECON '03, pp. 1162-1166 (2003) mentioned above.

On the other hand, in the direct power converter, the transistors Txp and Txn are normally-on-type switches, and thus J-FETs having a simple configuration can be used as the transistors Txp and Txn without change. This reduces a manufacturing cost. In addition, when wide-band-gap devices of SiC, GaN or the like are used as the transistors Txp and Txn, a J-FET that is easily manufactured can be used. As a result, it is possible to improve the control performance and conversion efficiency owing to a higher carrier of the direct power converter.

Figure 5:
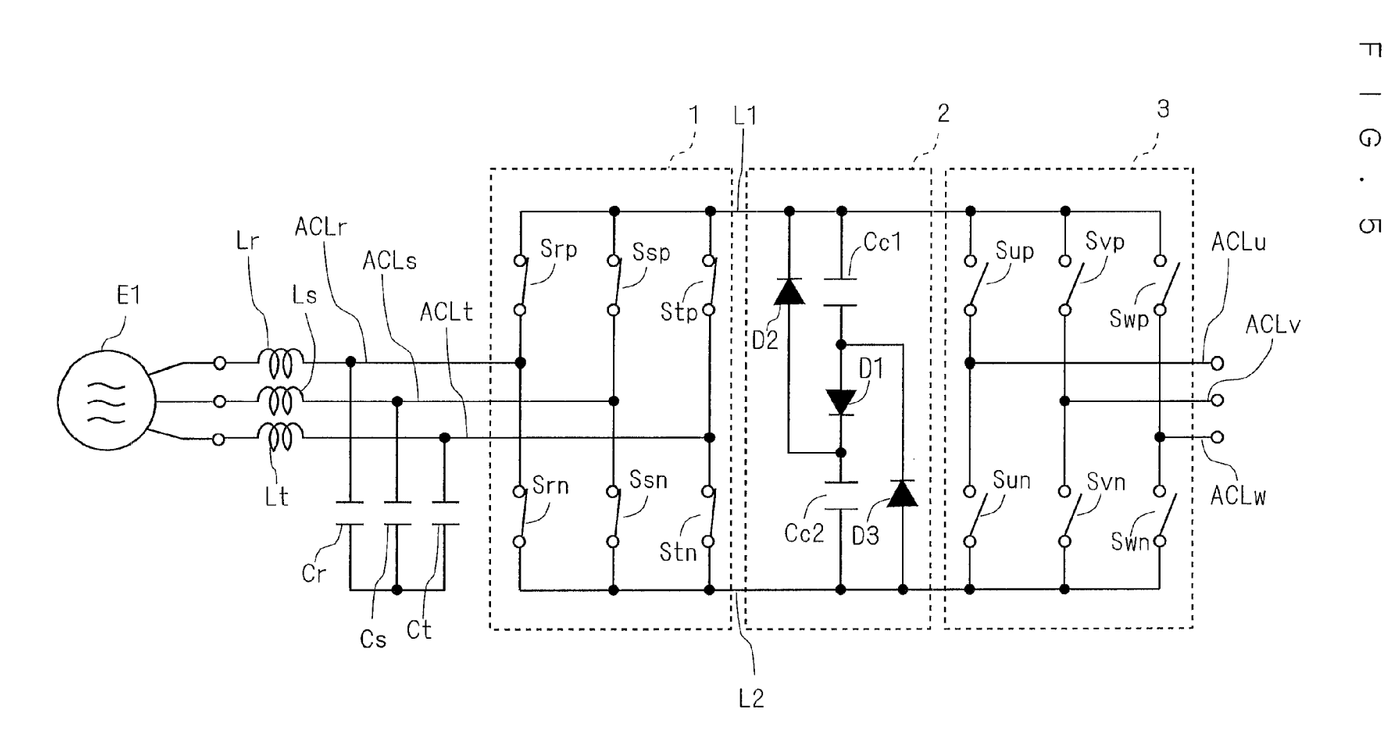
FIG. 5 is a diagram showing another example of the conceptual configuration of the direct power converter according to the first embodiment.

FIG. 5 shows another example of a conceptual configuration of a direct power converter. This is different from the direct power converter shown in FIG. 1 in the configuration of the clamp circuit 2.

The clamp circuit 2 includes clamp capacitors Cc1 and Cc2 and diodes D1 to D3. The clamp capacitors Cc1 and Cc2 are connected in series with each other between the DC power supply lines L1 and L2. The clamp capacitor Cc2 is provided on the DC power supply line L2 side with respect to the clamp capacitor Cc1.

The diode D1 is provided between the clamp capacitors Cc1 and Cc2, and an anode and a cathode thereof are connected to the clamp capacitor Cc1 and the clamp capacitor Cc2, respectively. An anode of the diode D2 is connected between the clamp capacitor Cc2 and the diode D1, and a cathode thereof is connected to the DC power supply line L1. An anode of the diode D3 is connected to the DC power supply line L2, and a cathode thereof is connected between the clamp capacitor Cc1 and the diode D1.

The clamp circuit 2 as described above operates as follows. In a case where, for example, an inductive load is connected to the voltage-source inverter 3 side, in some cases, the load current flowing therethrough lags behind the voltage between the DC power supply lines L1 and L2 depending on a load power factor thereof. In this case, there is a period of time when a return current flows from the inductive load to the DC power supply line L1, and the clamp capacitors Cc1 and Cc2 are charged in a state in series with each other. The charging voltage (voltage across both ends of a set of the clamp capacitors Cc1 and Cc2) on this occasion is also determined based on the load power factor. On the other hand, when the voltage across both ends of each of the clamp capacitors Cc1 and Cc2 becomes higher than the voltage between the DC power supply lines L1 and L2, the clamp capacitors Cc1 and Cc2 are discharged in a state in parallel with each other. Note that the clamp capacitors Cc1 and Cc2 are charged in the state in series with each other and discharged in the state in parallel with each other, whereby the discharging voltage is a half of the charging voltage.

The operation is made such that the voltages of the clamp capacitors Cc1 and Cc2 are balanced by the charging/discharging operation as described above.

As described above, the return current from the inductive load can be charged, discharged and charged again to the inductive load, whereby it is possible to drive the inductive load efficiently. Further, the clamp circuit 2 does not require a so-called active device such as a switch device, and thus power consumption and manufacturing cost can be reduced.

Second Embodiment

Figure 6:
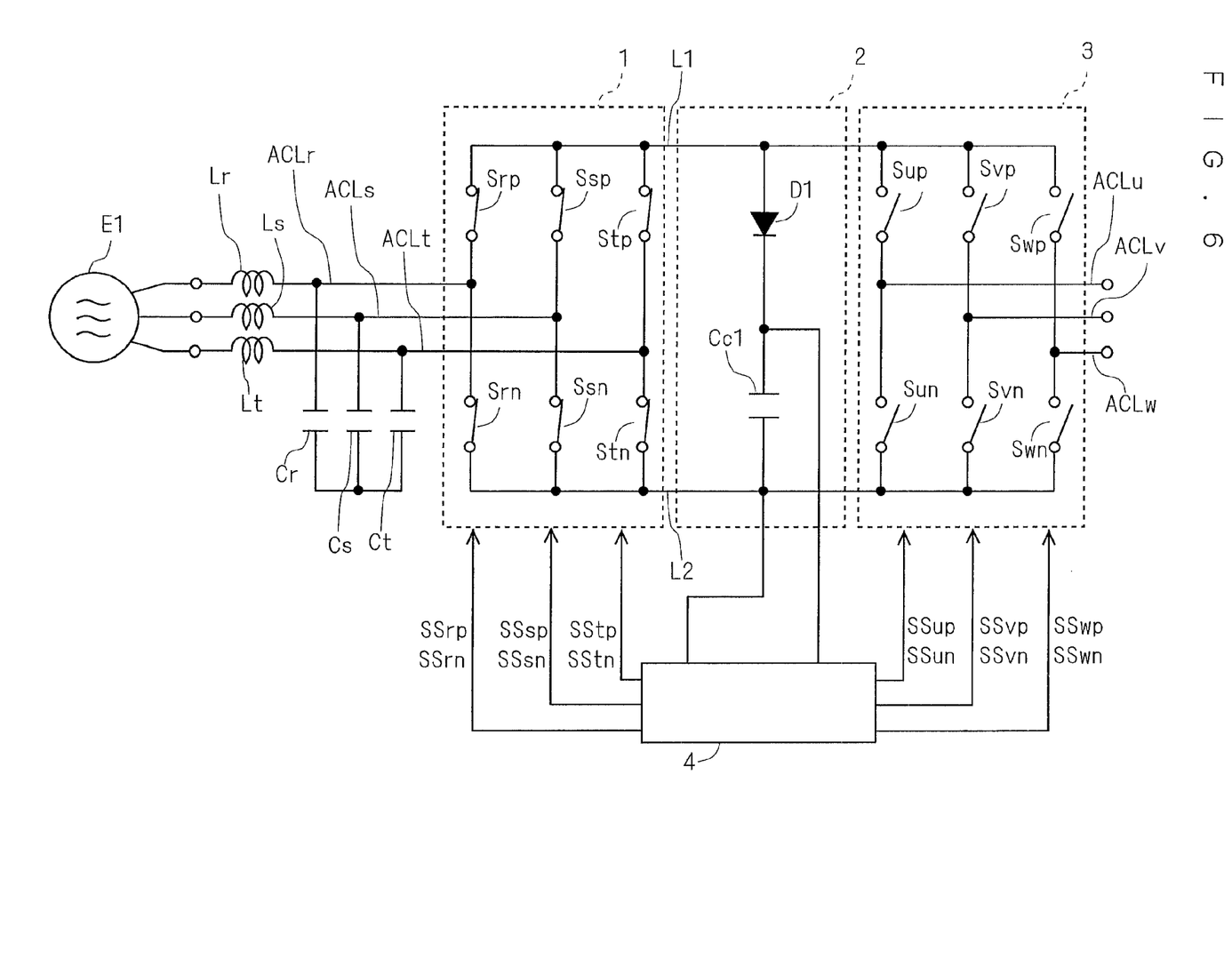
FIG. 6 is a diagram showing an example of a conceptual configuration of a direct power converter according to a second embodiment.

FIG. 6 shows an example of a conceptual configuration of a direct power converter according to a second embodiment. Compared with the direct power converter shown in FIG. 1, a control part 4 is further provided.

The control part 4 is connected to both ends of the clamp capacitor Cc1 and uses the voltage across the both ends of the clamp capacitor Cc1 as an operation power supply. The control part 4 supplies signals SSxp and SSxn to the current-source converter 1 (more specifically, transistors Txp and Txn) and supplies signals SSyp and SSyn to the voltage-source inverter 3 (more specifically, transistors Typ and Tyn).

The transistors Txp, Txn, Typ and Tyn are controlled to be brought into conduction/non-conduction based on the signals SSxp, SSxn, SSyp and SSyn, respectively.

According to the direct power converter as described above, a rectifier circuit that supplies the operation power supply to the control part 4 can be omitted, and thus a circuit size and a manufacturing cost can be reduced.

Figure 7:
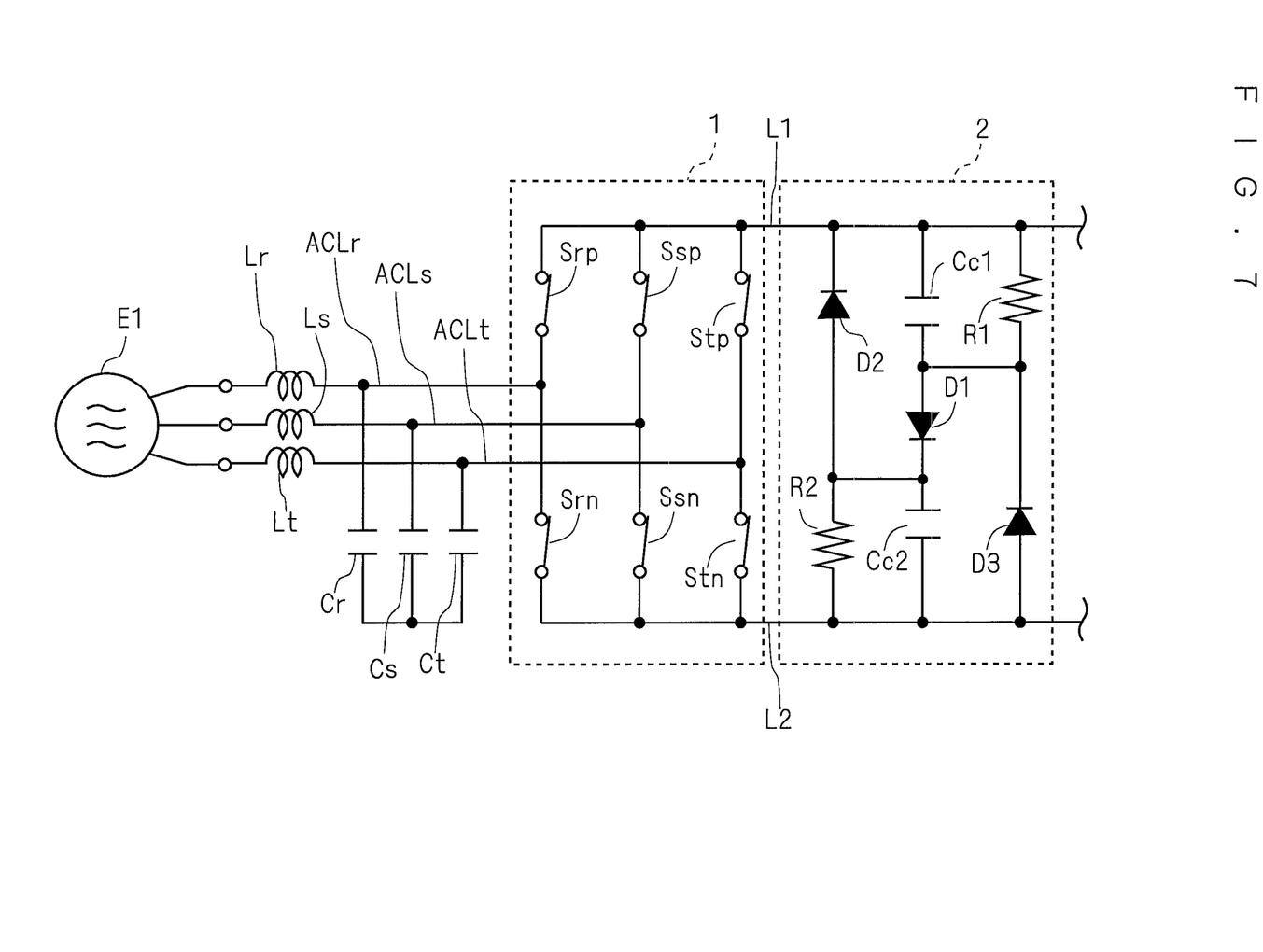
FIG. 7 is a diagram showing another example of the conceptual configuration of the direct power converter according to the second embodiment.

FIG. 7 shows another example of the conceptual configuration of the direct power converter. Note that subsequent stages to the clamp circuit 2 are omitted in FIG. 7. Compared with the direct power converter shown in FIG. 5, resistors R1 and R2 are connected to both ends of the clamp capacitors Cc1 and Cc2, respectively. The resistors R1 and R2 represent the control part 4 as resistors in a pseudo manner. For example, of the control part 4, the resistor R1 can be caused to serve as a control part on the converter 1 side, and the resistor R2 can be caused to serve as a control part on the inverter 3 side. It is desired that selection be made such that the control parts shown by the resistors R1 and R2 have approximately equal loads.

The control part 4 uses the voltage across the ends of the clamp capacitors Cc1 and Cc2 as an operation power supply. Therefore, the rectifier circuit that supplies the operation power supply to the control part 4 can be omitted, whereby a circuit size and a manufacturing cost can be reduced.

Third Embodiment

Figure 8:
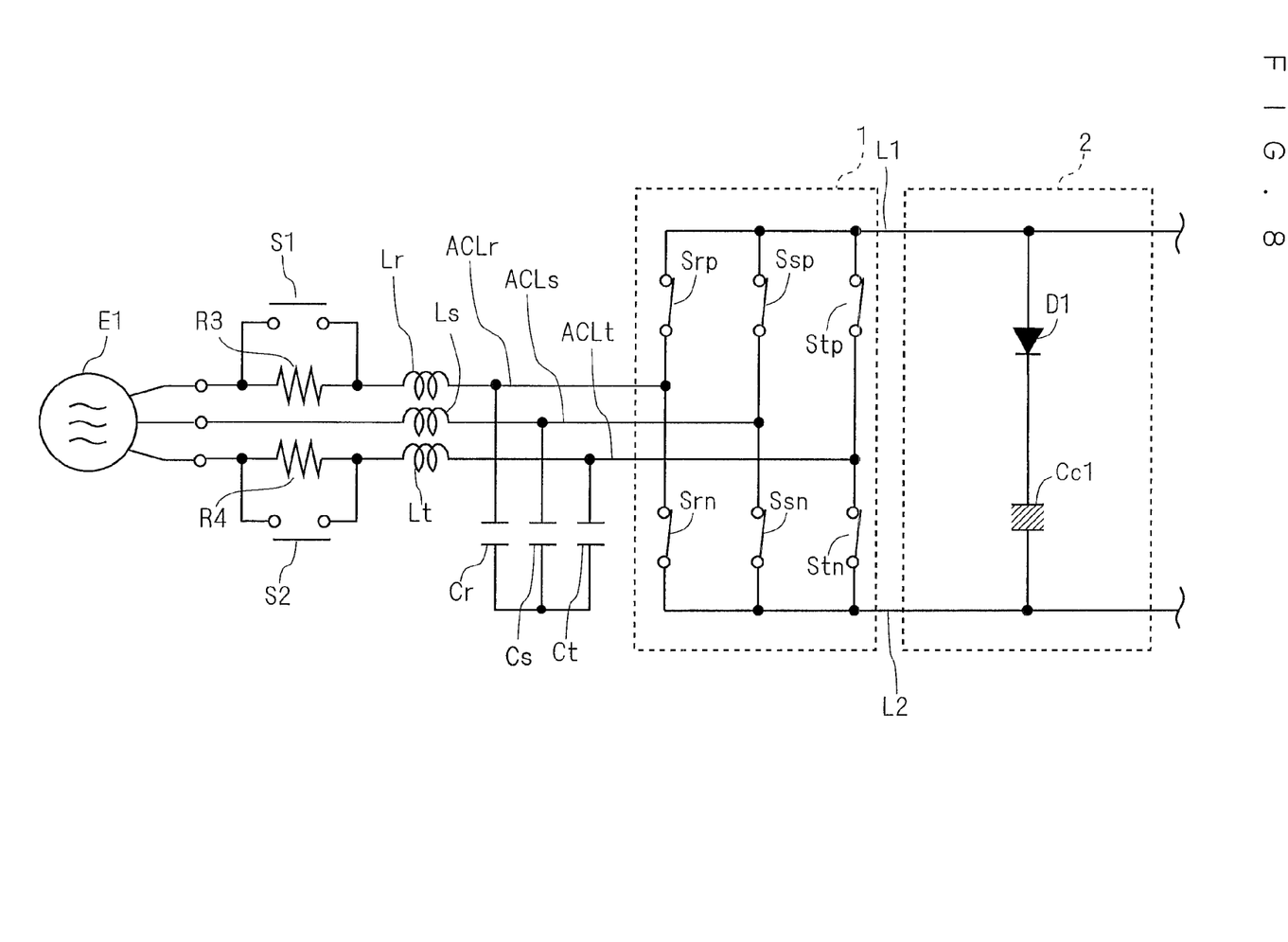
FIG. 8 is a diagram showing an example of a conceptual configuration of a direct power converter according to a third embodiment.

FIG. 8 shows an example of a conceptual configuration of a direct power converter according to a third embodiment. Note that subsequent stages to the clamp circuit 2 are omitted in FIG. 8. Compared with the direct power converter shown in FIG. 1, resistors R3 and R4 and switches S1 and S2 are further provided.

The resistors R3 and R4 are provided on at least any two of the input lines ACLr, ACLs and ACLt. For example, the resistors R3 and R4 are provided on the input lines ACLr and ACLt.

Accordingly, in charging the clamp capacitor Cc1, the current flowing from the power supply E1 to the clamp capacitor Cc1 flows through the resistors R3 and R4, whereby it is possible to reduce the inrush current flowing from the power supply E1 to the clamp capacitor Cc1. Therefore, the inrush current causes no problem even when, for example, an electrolytic capacitor having a large electric capacitance is used as the clamp capacitor Cc1.

The switches S1 and S2 are, for example, normally-off-type relays and are connected in parallel with the resistors R3 and R4, respectively. It is possible to avoid the loss caused to the resistors R3 and R4 in normal operation by bringing the switches S1 and S2 into conduction after the clamp capacitor Cc1 is charged.

Note that the clamp circuit 2 of FIG. 8 may be replaced with the clamp circuit 2 shown in FIG. 5.

While the invention has been shown and described in detail, the foregoing description is in all aspects illustrative and not restrictive. It is therefore understood that numerous modifications and variations can be devised without departing from the scope of the invention.

The invention claimed is:
1. A power converter, comprising:
a plurality of input lines applied with a first polyphase AC voltage;
a plurality of capacitors interposed between ones of said plurality of input lines;
a first DC power supply line;
a second DC power supply line applied with a lower potential compared with said first DC power supply line;
a converter comprising:
first diodes respectively provided correspondingly to said plurality of input lines, each of said first diodes having an anode connected to corresponding one side of said plurality of input lines and a cathode connected to said first DC power supply line side;
second diodes respectively provided correspondingly to said plurality of input lines, each of said second diodes having an anode connected to said second DC power supply line side and a cathode connected to said corresponding one side of said plurality of input lines; and switch parts respectively provided correspondingly to said plurality of input lines, selecting conduction/non-conduction through said first diode between said corresponding one of said plurality of input lines and said first DC power supply line and conduction/non-conduction through said second diode between said corresponding one of said plurality of input lines and said second DC power supply line based on external signals and bringing said corresponding one of said plurality of input lines into conduction with said first and second DC power supply lines in a state of not receiving said signals;

a clamp capacitor connected between said first and second DC power supply lines;

an inverter configured to convert a voltage between said DC power supply lines into a second polyphase AC voltage to be outputted via a plurality of output lines; and a controller configured to selectively supply said signals to said switch parts, wherein a voltage across said clamp capacitor serves as a sole operation power supply for said controller, and said clamp capacitor serves as a sole capacitor connected between said first and second DC powers supply lines and between said converter and inverter.

2. The power converter according to claim 1, wherein said switch parts include a junction field effect transistor.

3. The power converter according to claim 2, further comprising:

a third diode having an anode positioned on said first DC power supply line side and a cathode positioned on said second DC power supply line side, being connected in series with said clamp capacitor, wherein said inverter comprises:

a high-arm-side switch device selecting conduction/non-conduction between one of said plurality of output lines and said first DC power supply line; and a low-arm-side switch device selecting conduction/non-conduction between said one of said plurality of output lines and said second DC power supply line.

4. The power converter according to claim 3, wherein said high-arm-side switch device and said low-arm-side switch device include an insulated gate bipolar transistor.

5. The power converter according to claim 1, further comprising:

a third diode having an anode positioned on said first DC power supply line side and a cathode positioned on said second DC power supply line side, being connected in series with said clamp capacitor, wherein said inverter comprises:

a high-arm-side switch device selecting conduction/non-conduction between one of said plurality of output lines and said first DC power supply line; and a low-arm-side switch device selecting conduction/non-conduction between said one of said plurality of output lines and said second DC power supply line.

6. The power converter according to claim 5, wherein said high-arm-side switch device and said low-arm-side switch device include an insulated gate bipolar transistor.

7. The power converter according to claim 1, further comprising:

a first input resistor interposed between a first capacitor of said plurality of capacitors and a power supply providing said polyphase AC voltage on a first input line of the plurality of input lines;

a second input resistor interposed between a second capacitor of said plurality of capacitors and the power supply on a second input line of the plurality of input lines;

a first relay connected in parallel with the first input resistor; and a second relay connected in parallel with the second input resistor, wherein the first and second relays are normally-off-type relays and are switched into conduction after said clamp capacitor is charged.

8. A power converter, comprising:

a plurality of input lines applied with a polyphase AC voltage;

a plurality of capacitors interposed between ones of said plurality of input lines;

a first DC power supply line;

a second DC power supply line applied with a lower potential compared with said first DC power supply line;

a converter comprising first diodes respectively provided correspondingly to said plurality of input lines, each of said first diodes having an anode connected to corresponding one side of said plurality of input lines and a cathode connected to said first DC power supply line side;

second diodes respectively provided correspondingly to said plurality of input lines, each of said second diodes having an anode connected to said second DC power supply line side and a cathode connected to said corresponding one side of said plurality of input lines; and switch parts respectively provided correspondingly to said plurality of input lines, selecting conduction/non-conduction through said first diode between said corresponding one of said plurality of input lines and said first DC power supply line and conduction/non-conduction through said second diode between said corresponding one of said plurality of input lines and said second DC power supply line based on external signals and bringing said corresponding one of said plurality of input lines into conduction with said first and second DC power supply lines in a state of not receiving said signals;

a clamp capacitor connected between said first and second DC power supply lines;

a controller configured to selectively supply said signals to said switch parts, wherein a voltage across said clamp capacitor serves as a sole operation power supply for said controller; and a clamp circuit including said clamp capacitor connected to a second clamp capacitor, said clamp capacitor and the second clamp capacitor interposed between said first and second DC power supply lines, one terminal of said clamp capacitor connected to the first DC power supply line and one terminal of the second clamp capacitor connected to the second DC power supply line;

a first clamp diode connected between said clamp capacitor and the second clamp capacitor, an anode of said first clamp diode connected to said clamp capacitor and a cathode of said first clamp diode connected to the second clamp capacitor;

a second clamp diode having an anode connected to the cathode of the first clamp diode and having a cathode connected to the first DC power line; and a third clamp diode having an anode connected to the second DC power line and a cathode connected to the anode of the first clamp diode.

9. The power converter according to claim 8, further comprising:

a first clamp resistor connected between the anode of the second clamp diode and the second DC power line; and a second clamp resistor connected between the cathode of the third clamp diode and the first power line.

10. The power converter according to claim 9, wherein a load across the first clamp resistor is substantially equal to a load across the second clamp resistor.

* * * * *